US006411830B2

(12) United States Patent
Alon et al.

(10) Patent No.: US 6,411,830 B2
(45) Date of Patent: *Jun. 25, 2002

(54) SYSTEM AND METHOD FOR REDUCING POWER CONSUMPTION IN WAITING MODE

(75) Inventors: Ram Alon, Herzlia; David Ben-Eli, Modiin; Asaf Schushan, Ramat Hasharon; Yona Leshets, Zur Igal, all of (IL)

(73) Assignee: D.S.P.C. Technologies Ltd, Petach Tikva (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/161,309

(22) Filed: Sep. 28, 1998

Related U.S. Application Data

(63) Continuation-in-part of application No. 08/906,089, filed on Aug. 5, 1997, now Pat. No. 6,176,611.

(51) Int. Cl.[7] .............................................. H04B 7/216

(52) U.S. Cl. ....................... 455/574; 455/343; 370/311; 370/335

(58) Field of Search .......................... 368/10, 117–120, 368/201, 202; 455/556, 557, 574, 575, 343; 370/311, 335

(56) References Cited

U.S. PATENT DOCUMENTS

| | | | | | |
|---|---|---|---|---|---|
| 4,264,967 | A | | 4/1981 | Fujita et al. | |
| 5,224,152 | A | | 6/1993 | Harte | |
| 5,357,490 | A | | 10/1994 | Kashine | 368/119 |
| 5,416,435 | A | | 5/1995 | Jokinen et al. | |
| 5,428,638 | A | | 6/1995 | Cioffi et al. | |
| 5,444,672 | A | | 8/1995 | Kushita | |
| 5,448,755 | A | * | 9/1995 | Tanaka | 455/343 |
| 5,568,513 | A | | 10/1996 | Croft et al. | |
| 5,596,571 | A | | 1/1997 | Gould et al. | |
| 5,708,658 | A | * | 1/1998 | Sugita | 370/311 |
| 5,737,323 | A | * | 4/1998 | Lansdowne | 455/343 |
| 5,790,941 | A | * | 8/1998 | Peponides | 455/343 |
| 6,009,319 | A | * | 12/1999 | Khullar et al. | 455/574 |

* cited by examiner

*Primary Examiner*—Lester G. Kincaid
(74) *Attorney, Agent, or Firm*—Eitan, Pearl, Latzer & Cohen-Zedek

(57) ABSTRACT

A timer for measuring a time period including a high frequency generating unit, a low frequency generating unit and a controller connected to the high and low frequency generating units, wherein the controller deactivates the high frequency generating unit during at least a portion of the time period, detects and counts predetermined portions of the signals provided by the high and low frequency generating units and counts a plurality of the portions of the currently active frequency generating unit.

3 Claims, 10 Drawing Sheets

SYSTEM AND METHOD FOR REDUCING POWER CONSUMPTION IN WAITING MODE

CROSS-REFERENCE TO PREVIOUS APPLICATIONS

This application is a continuation-in-part of U.S. Ser. No. 08/906,089 filed Aug. 5, 1997, now U.S. Pat. No. 6,176,611, issued Jan. 23, 2001.

FIELD OF THE INVENTION

The present invention relates to a method and system for low power precision timing, in general and to a method and a device for providing improved power consumption, while maintaining precise timing, of a communication system in waiting mode, in particular.

BACKGROUND OF THE INVENTION

Methods and devices for providing precise timing and precise time counting are known in the art. Such devices conventionally include a crystal for providing a basic frequency and a controller for accumulating the clock signals generated by the crystal. When such a system attempts to increase the accuracy of the counting mechanism, it utilizes a high frequency crystal which increases the resolution in time.

It would be appreciated that frequency and energy are associated in a way that producing a higher frequency requires higher power to be provided thereto. The basic quantum rule is presented by the expression:

$$E=h\cdot f$$

wherein E represents energy, h represents Planck's coefficient and f represents frequency.

In CMOS design, the following expression is used:

$$P=C\cdot V^2\cdot f$$

wherein P represents power, C represents capacity and V represents voltage.

Methods for managing power of a communication system in waiting mode are known in the art. A conventional communication system, in waiting mode has to detect hailing signals and open a communication channel when it detects a hailing signal which is addressed thereto.

Conventional communication protocols, such as TDMA, determine time periods in which hailing signals are transmitted. State of the art communication systems, attempt to shut down their receiver, when out of these time periods, so as to save power. Such systems are described in U.S. Pat. No. 5,568,513 to Croft et al. and U.S. Pat. No. 5,224,152 to Harte.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a timing mechanism which includes two levels of timing.

A high timing level, which provides high resolution timing and a low timing level which provides low timing resolution, combined with a low power consumption. The combination of these two timing levels, according to the invention, reduces power consumption significantly.

Figure 1:
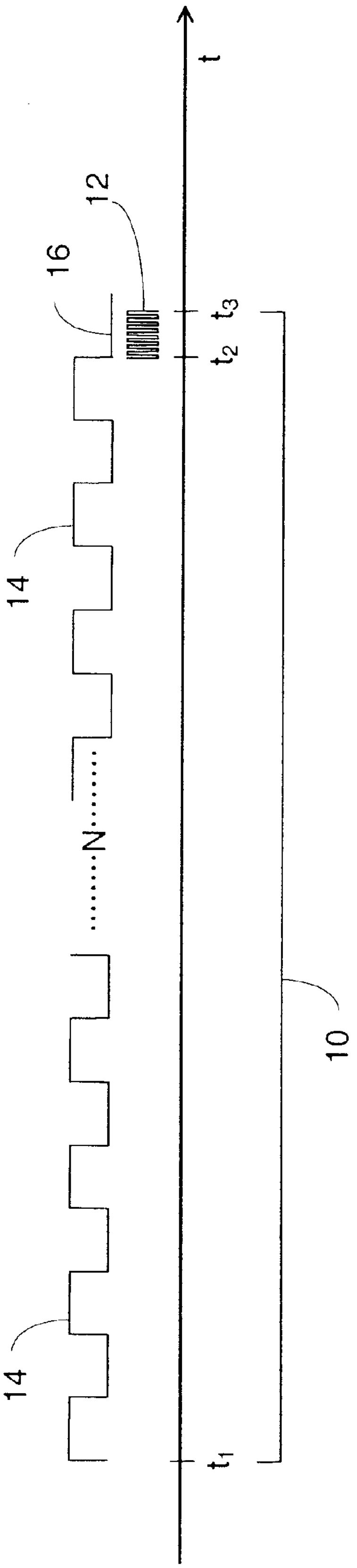
FIG. 1 is a schematic illustration of a timing diagram of two timing levels, in accordance with a preferred embodiment of the present invention.

Reference is now made to FIG. 1, which is a schematic illustration of a timing diagram of two timing levels, in accordance with a preferred embodiment of the present invention.

Time period 10, from $t_1$ to $t_3$, represents a predetermined time period which needs to be counted and indicated. Timing level 12 is a high frequency timing level. Timing level 14 is a precise low frequency timing level. Maintaining timing level 12 requires more power than maintaining is timing level 14.

Time period 10 can not be represented by a natural number of half cycles of the low timing level 14. When $t_1$ is aligned with the rising point of the first cycle of the low timing level 14 then, $t_3$ occurs within the last cycle 16 of low timing level 14.

$t_3$ does not align with either a rise or a fall of a cycle of the low timing level 14. Thus, the low timing level 14 can not be used to indicate $t_3$. It will be appreciated that time period 10 can be represented by the expression:

$$T=N\times T_L+M\times T_H+\epsilon;\epsilon<T_H$$

wherein T represents time period 10, $T_H$ represents half of a single cycle of the high timing level, $T_L$ represents half of a single cycle of the low timing level and M and N are natural numbers.

It will be appreciated that a conventional oscillators (and for that matter, crystal) incorporate an error. Accordingly, the $T_H$ and $T_L$ have errors $\Delta T_H$ and $\Delta T_L$, respectively. Thus, N and M are evaluated according to these errors so that $$|T-(N\times T_L+M\times T_H)|\leqq\Delta T$$

wherein $\Delta T$ is a maximal predetermined error of time period T.

$t_2$ represents a point in time where the low timing level 14 has the last rise or fall. This occurs before $t_3$. At $t_2$, the high timing level 12 is activated and the low timing level 14 is deactivated. Then, the high timing level 12 counts the time period from $t_2$ to $t_3$ and provides an indication of $t_3$.

Accordingly, the present invention provides high resolution timing mechanism, using a combination low timing level and high timing level, wherein the overall resolution is determined according to the resolution of the high timing level.

Figure 2:
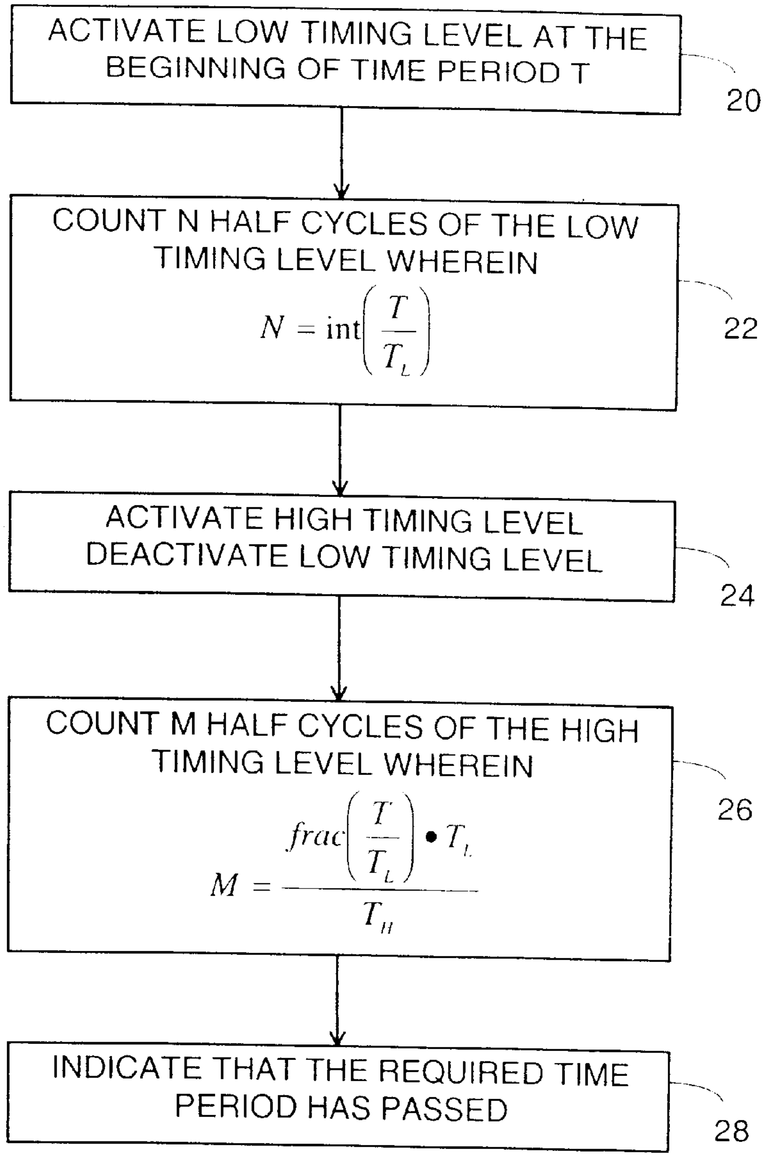
FIG. 2 is a schematic illustration of a method for providing a time count of a predetermined time period T using the two timing levels of FIG. 1, in accordance with a further preferred embodiment of the present invention.

Reference is now made to FIG. 2, which is a schematic illustration of a method for providing a time count of a predetermined time period T using the two timing levels of FIG. 1, in accordance with a further preferred embodiment of the present invention.

In step 20, the low timing 14 is activated at the beginning of time period T.

In step 20, N half cycles of the low timing level are counted, wherein $$N=\mathrm{int}\left(\frac{T}{T_L}\right).$$

Right after these N half cycles, the high timing level 12 is activated and the low timing level 14 is deactivated (step 24)

In step 26, M half cycles of the high timing level are counted, wherein $$M=\frac{frac\left(\frac{T}{T_L}\right)\cdot T_L}{T_H}.$$

It will be noted that a compatible calculation using an integer function is also applicable for this step.

In step 28, the end of time period T is indicated.

Figure 3:
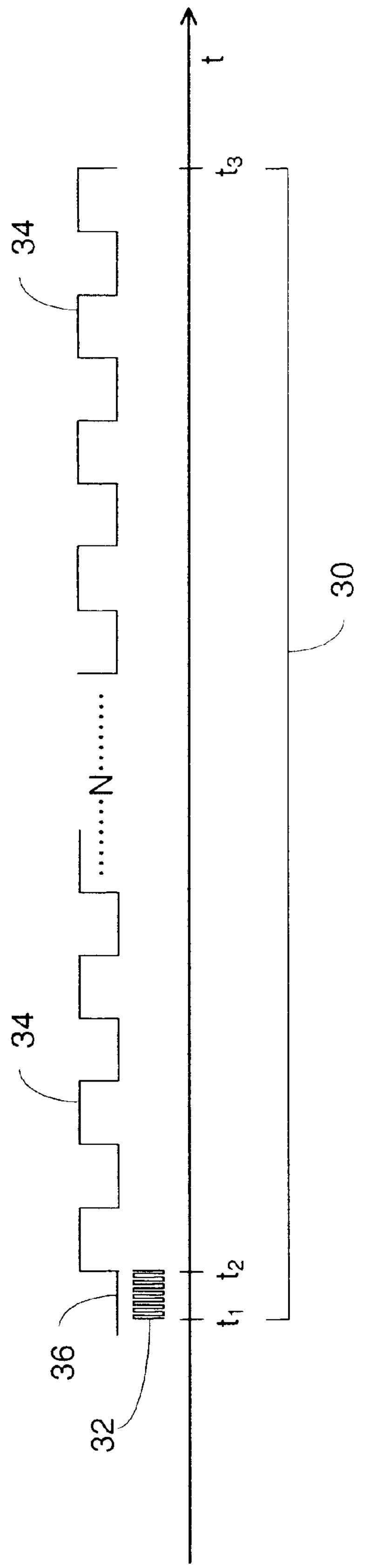
FIG. 3 is a schematic illustration of a timing diagram of two timing levels, in accordance with another preferred embodiment of the present invention.

Reference is now made to FIG. 3, which is a schematic illustration of a timing diagram of two timing levels, in accordance with another preferred embodiment of the present invention.

Time period 30, from $t_1$ to $t_3$, represents a predetermined time period which needs to be counted and indicated. Timing level 32 is a high frequency timing level. Timing level 34 is a precise low frequency timing level. Maintaining timing level 32 requires more power than maintaining timing level 34.

Time period 30 can not be represented by a natural number of half cycles of the low timing level 34. When $t_3$ is aligned with the rising point of the first cycle of the low timing level 34, then $t_1$ occurs within a cycle 36 of low timing level 34. $t_1$ does not align with either a rise or a fall of a cycle of the low timing level 34. Thus, the low timing level 34 can not be used to indicate $t_3$.

$t_2$ represents a point in time where the low timing level 34 has the first rise or fall after $t_1$. The time period from $t_2$ to $t_3$ can be represented by a natural number of half cycles of the low timing level 34.

At $t_2$, the low timing level 34 is activated and the high timing level 32 is deactivated. Then, the low timing level 34 counts the time period from $t_2$ to $t_3$ and provides an indication of $t_3$.

Figure 4:
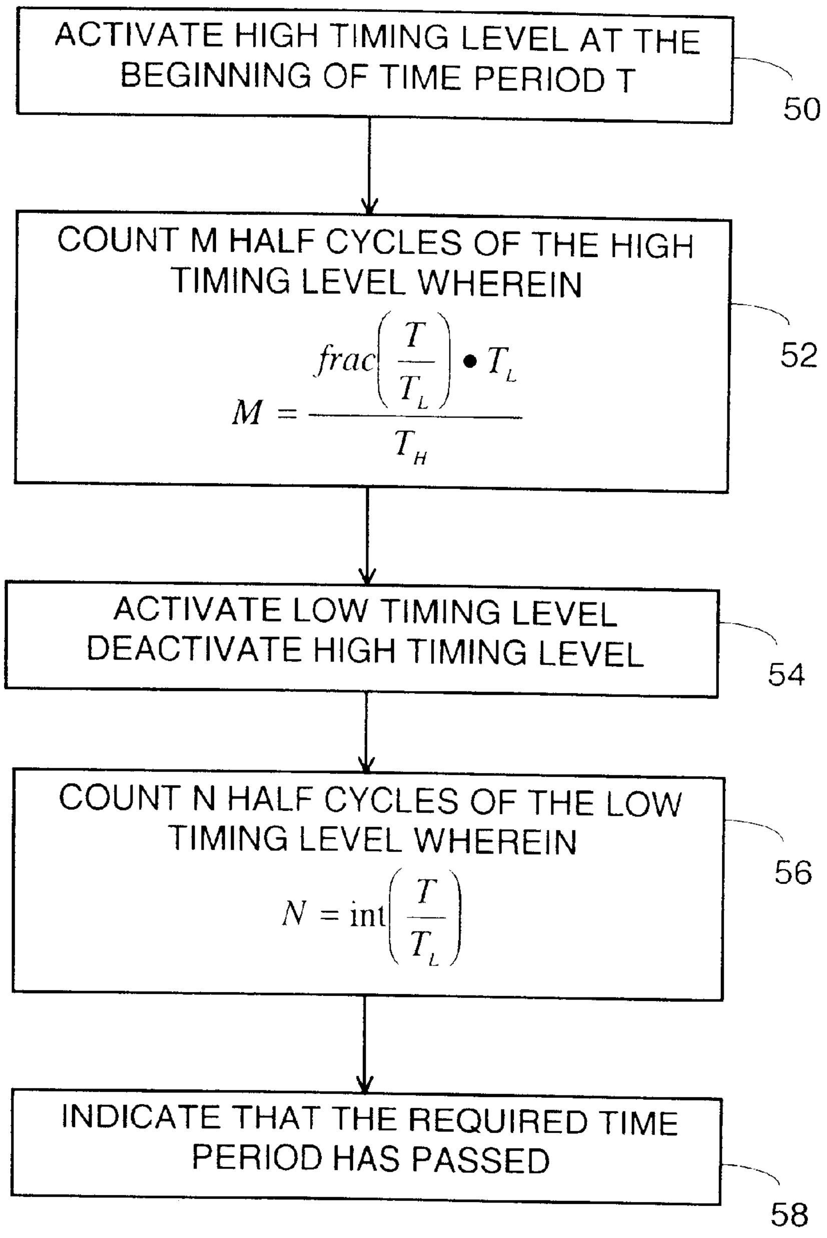
FIG. 4 is a schematic illustration of a method for providing a time count of a predetermined time period T using the two timing levels of FIG. 3, in accordance with another preferred embodiment of the present invention.

Reference is now made to FIG. 4, which is a schematic illustration of a method for providing a time count of a predetermined time period T using the two timing levels of FIG. 3, in accordance with another preferred embodiment of the present invention.

In step 50, the high timing level 32 is activated at the beginning of time period T.

In step 52, M half cycles of the high timing level are counted, wherein $$M=\frac{frac\left(\frac{T}{T_L}\right)\cdot T_L}{T_H}.$$

Right after these M half cycles, the low timing level 34 is activated and the high timing level 32 is deactivated (step 54).

In step 56, N half cycles of the low timing level are counted, wherein $$N=\mathrm{int}\left(\frac{T}{T_L}\right).$$

In step 58, the end of time period T is indicated.

Some oscillators, after they are activated, require at least a predetermined period of time to stabilize, before they can produce a constant stable frequency signal. Accordingly, the present invention provides a solution which enables utilizing such oscillators.

Figure 5:
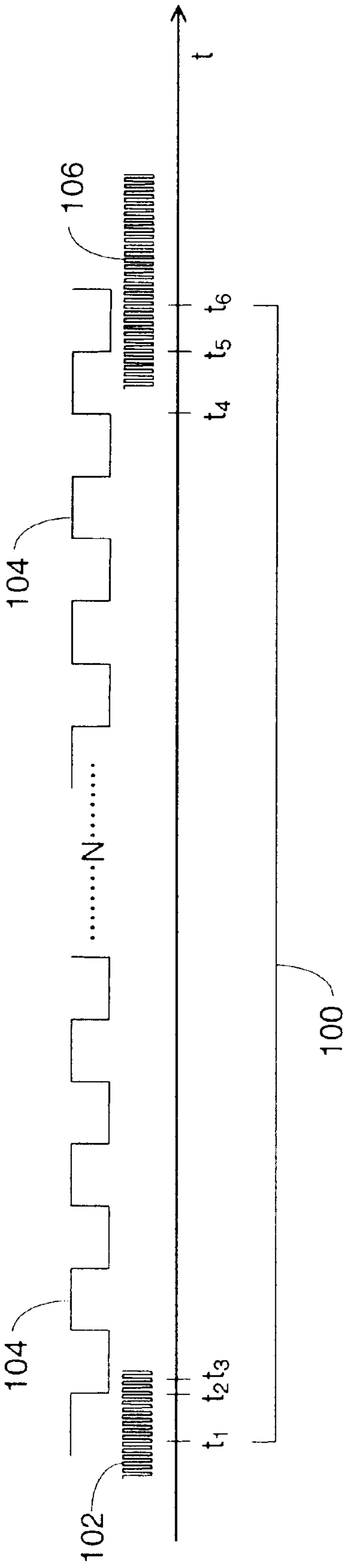
FIG. 5 is a schematic illustration of a timing diagram of two timing levels, in accordance with yet another preferred embodiment of the present invention.

Reference is now made to FIG. 5, which is a schematic illustration of a timing diagram of two timing levels, in accordance with a further preferred embodiment of the present invention.

Time period 100, from $t_1$ to $t_6$, represents a predetermined time period which needs to be counted and indicated. Timing level 102 is a high frequency timing level. Timing level 104 is a precise low frequency timing level. Maintaining timing level 102 requires more power than maintaining timing level 104.

According to the invention, once $t_1$ is detected, using high timing level 102, then, the low timing level 104 is activated. $t_2$ represents a point in time where the high timing level 102 and the low timing level 104 align, after which the high timing level 102 can be deactivated. Accordingly, the high timing level 102 is deactivated at time point $t_3$. The time period from $t_1$ to $t_2$ is represented by $M_1$ half cycles of the high timing level.

According to the present example, $t_6$ occurs within a cycle of the low timing level 104. Accordingly, the low timing level 104 can not indicate $t_6$ with sufficient accuracy.

Low timing level 104 counts a time period from $t_2$ to $t_4$, at low power consumption. At $t_4$, after the low timing level 104 has counted a predetermined number of half cycles N, then, the high timing level 106 is reactivated. It will be appreciated by those skilled in the art that conventionally, when a crystal oscillator is activated, it requires some time to stabilize thereby producing a constant frequency, as required.

$t_5$ represents a point in time in which the high timing level 106 and the low timing level align. The low timing level 104 can be deactivated after $t_5$.

Then, the high timing level 106 counts $M_2$ half cycles, after which, the end of time period 100 can be indicated.

Time period 100 can be represented by the expression:

$$T=N\times T_L+(M_1+M_2)\times T_H$$

wherein T represents time period 100, $T_H$ represents half of a single cycle of the high timing level, $T_L$ represents half of a single cycle of the low timing level and $M_1$, $M_2$ and N are natural numbers.

Figure 6:
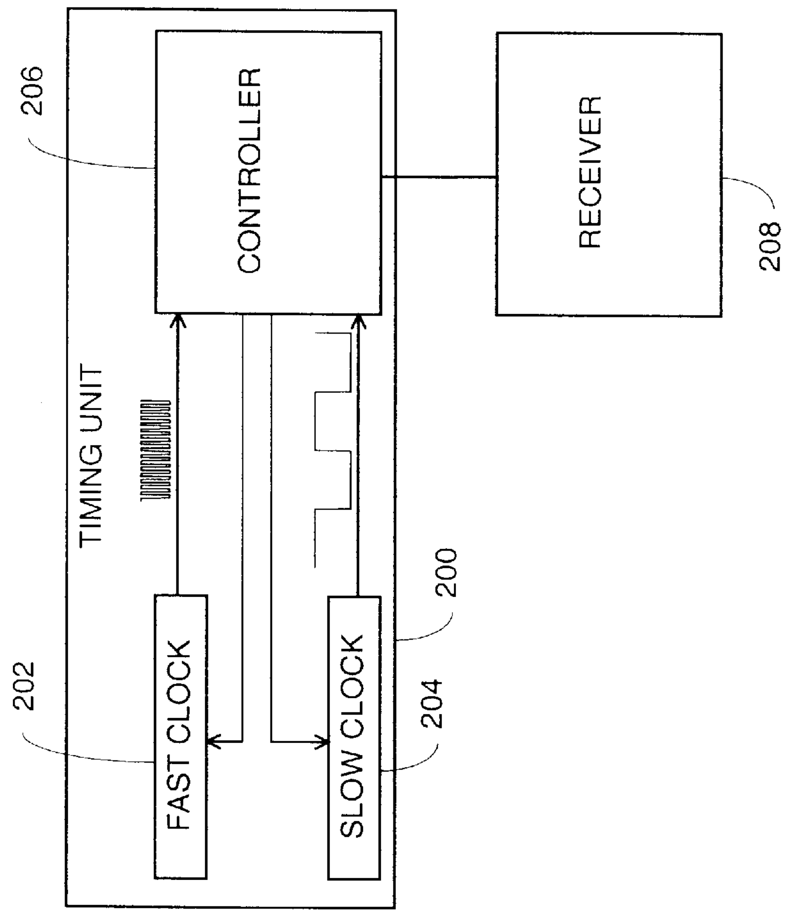
FIG. 6 is a schematic illustration of a timing system, constructed and operative in accordance with another preferred embodiment of the present invention.

Reference is made now to FIG. 6 which is a schematic illustration of a timing system, generally referenced 200, constructed and operative in accordance with another preferred embodiment of the present invention.

System 200 includes a fast clock 202, for producing a high frequency, a slow clock 204, for producing a low frequency and a controller 206, connected to the fast clock 202 and the slow clock 204.

The controller 206 controls each of the clocks 202 and 204 so as to activate, deactivate, count and moderate them. The controller 206 is also connected to a receiver 208. The controller 206 provides the receiver timing frequencies. In the present example, the controller 206 is also capable of activating, deactivating, enabling and disabling the receiver 208.

Figure 7:
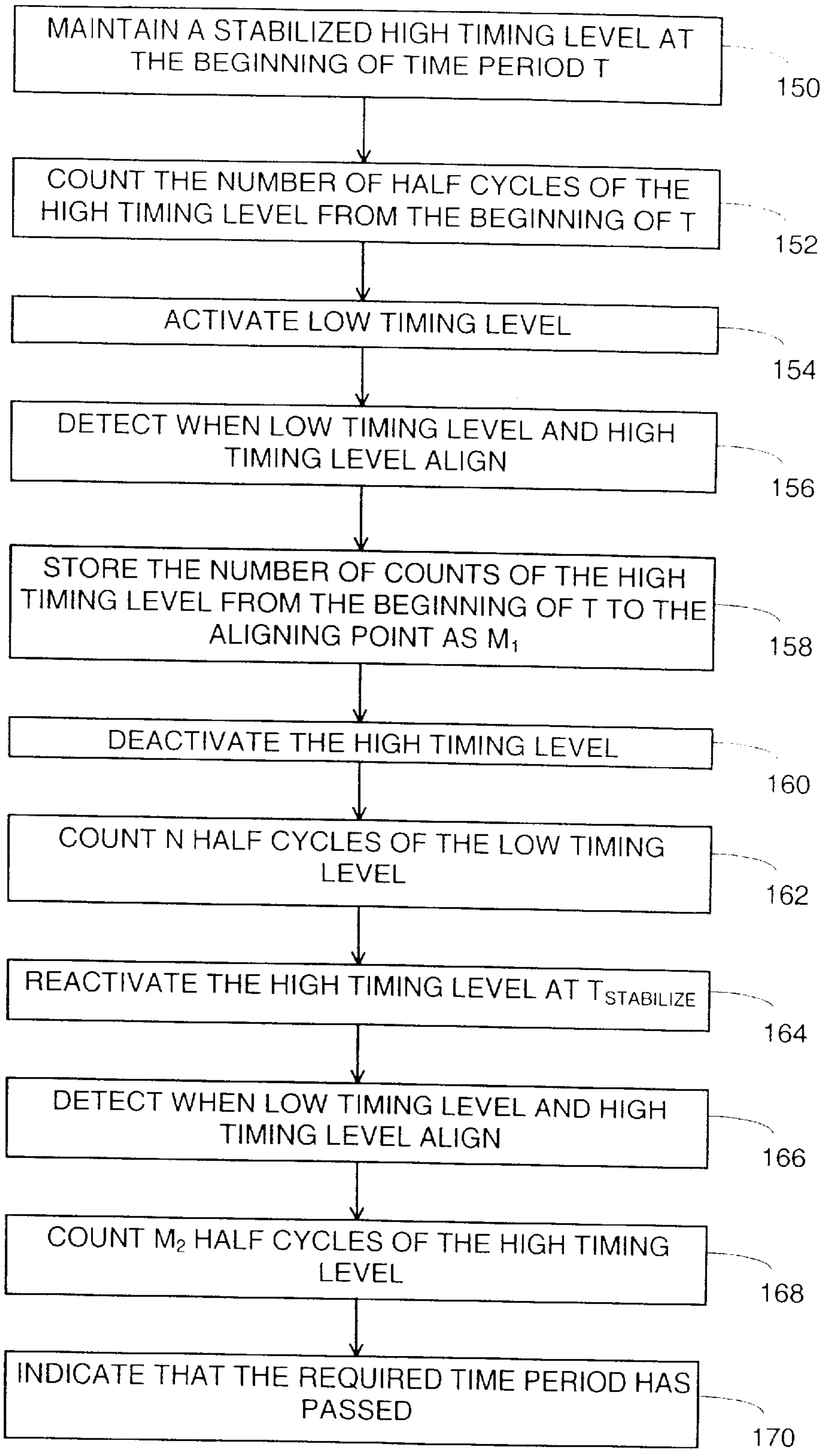
FIG. 7 is a schematic illustration of a method for operating the system of FIG. 6, providing a time count of a predetermined time period T using the two timing levels of FIG. 5, operative in accordance with another preferred embodiment of the present invention.

Reference is also made to FIG. 7, which is a schematic illustration of a method for operating the system 200 of FIG. 6, providing a time count of a predetermined time period T using the two timing levels of FIG. 5, in accordance with another preferred embodiment of the present invention.

In step 150, a high timing level 102 (FIG. 5) is maintained at the beginning ($t_1$) of time period T (time period 100). Then, the controller 206 counts half cycles of the signal provided by the fast clock 202, from $t_1$ (step 152).

In step 154, a low timing level 104 (FIG. 5) is activated. In the present example, the controller 206 activates the slow clock 204 and detects when the signals, provided by the slow clock 204 and the fast clock 202, align (step 156). In the present example $t_2$ of FIG. 5 represents this alignment point. Then, the system 200 stops counting the signal of the fast clock and starts counting the signal of the slow clock.

In step 158, the system 200 stores the number of counts of the fast clock, from $t_1$ to $t_2$, in a variable $M_1$.

In step 160, the high timing level, represented by the fast clock 202, is deactivated. In the present example, the controller 206 shuts down the fast clock 202 at $t_3$. It will be noted that the power consumption of system 200 is considerably lower when the slow clock 204 is operative than the power consumption achieved when the fast clock 202 is operative. It will be further appreciated that when the controller 206 is connected to an external device, such as receiver 208, then, the controller 206 may disable this device or shut it down, for further power consumption decrease.

In step 162, the N half cycles of the low timing level, are counted. In the present example, the controller 206 counts N half cycles of the signal provided by the slow clock 204, according to the expression:

$$N = \mathrm{int}\left(\frac{T - M_1 \times T_H}{T_L}\right).$$

In step 164, the high timing level 106 is reactivated at $T_{STABILIZE}$, which is a point in time before N half cycles of the low timing level are completed, required for stabilizing the high timing level. In the present example, the controller 206 reactivates the fast clock 202 at $t_4$.

In step 166, a point in time is detected, where the high timing level 102 and the low timing level 104 align. It will be noted that this point in time should also represent the completion of counting N half cycles of the low timing level. In the present example, the controller 206 detects when the fast clock 202 and the slow clock 204 align ($t_5$).

In step 168, $M_2$ half cycles of the high timing level 106 are counted. In the present example, the controller 206 counts the half cycles of the signal provided by the fast clock 202 according to the expression:

$$M_2 = \frac{frac\left(\frac{T - M_1 \times T_H}{T_L}\right) \cdot T_L}{T_H}.$$

In step 170, after completing the count of $M_2$ high timing level half cycles, the end of the time period T is indicated. In the present example, the controller 206 indicates the end of time period 100 to the receiver 208.

For example, in a cellular TDMA implementation, the slow clock 204 comprises a clock of up to 100 KHz and the fast clock 202 comprises a clock of up to 20 MHz. Such clocks are manufactured and sold by DAISHINKU CORP., a Japanese company which is located in Tokyo and Vectron, a US company, which is located in New-York. It will be noted that any oscillating mechanism is applicable for the present invention.

In TDMA, a hailing signal lasts for about 50 ms and may be detected once every 1 second. A conventional timer would use fast crystal, thereby requiring energy $E_{OLD}$ which is given by the following expression:

$$E_{OLD} = P_{OLD} \cdot T = C \cdot V^2 \cdot 2 \cdot 10^7 \cdot 1 \text{ sec}$$

A timer constructed according to the present invention, would use fast crystal (for example at a frequency of 20 MHz) and a slow crystal (for example at a frequency of 100 KHZ) combination, thereby requiring energy $E_{NEW}$ which is given by the following expression:

$$E_{NEW} = P_{NEW} \cdot T = C \cdot V^2 \cdot (2 \cdot 10^7 \cdot 0.05 \text{ sec} + 1 \cdot 10^5 \cdot 0.95 \text{ sec})$$

Accordingly, the ratio $$\frac{E_{NEW}}{E_{OLD}} < 6\%$$

defines that using a timer constructed and operative, in accordance with the present invention, would decrease the power consumption of a cellular unit, in wait mode, by at least ninety-four percent.

Low frequency crystals are generally susceptible to frequency shifts due to environmental changes with respect to temperature, humidity and the like. In communication implementation of the invention, which will be discussed hereinbelow, the frequency of the low timing level has to be evaluated from time to time.

Accordingly, the receiver 208 provides an indication of the frequency of a received signal, which was originally sent by a referenced station. In cellular communication, such a reference station can be a cellular base station which conventionally comprises a high precision high frequency timing crystal, incorporated in a precise and stable frequency mechanism.

The controller 206 utilizes the reference frequency, provided by the receiver 208, to evaluate the frequency of the low timing level. This process is performed, thoroughly, before the system 200 enters waiting mode and constantly, during this waiting mode, each time that the receiver 208 is activated.

Since, a typical duty cycle of the system takes no more than several seconds, the controller 206 is able to evaluate the frequency of the slow clock 204, with enhanced accuracy.

Figure 8:
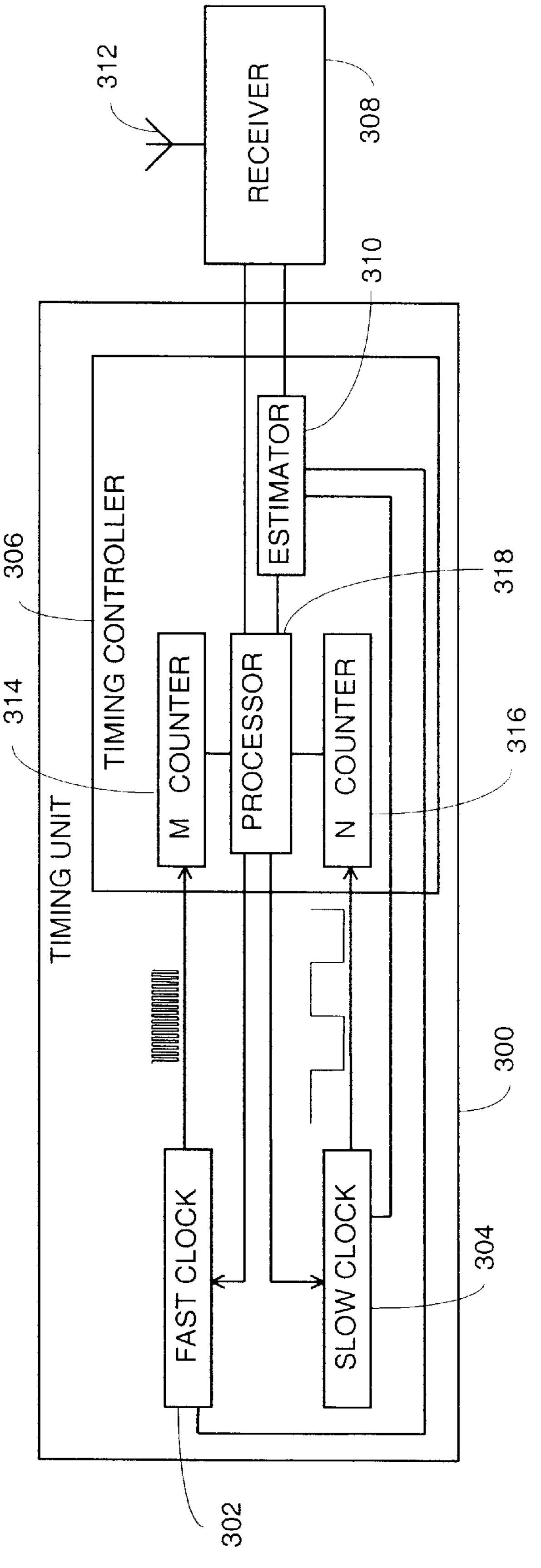
FIG. 8 is a schematic illustration of a timing system, constructed and operative in accordance with a further preferred embodiment of the present invention.

Reference is made now to FIG. 8 which is a schematic illustration of a timing system, generally referenced 300, constructed and operative in accordance with a further preferred embodiment of the present invention.

System 300 includes a fast clock 302, a slow clock 304 and a timing controller 306 which is connected to the fast clock 302 and the slow clock 304. The timing controller 306 includes a processor 318, two counters 314 and 316, which are connected to the processor 318 and an estimator 310, which is connected to the processor 318.

The counter 314 counts portions of the signal provided by the fast clock 302 and is connected thereto. The counter 316 counts portions of the signal provided by the slow clock 304 and is connected thereto.

The estimator 310 is further connected to clocks 302 and 304 and to a receiver 308. The processor 318 is also connected to the receiver 308 and controls it. The receiver 308 receives signals from an antenna 312.

According to the present example, system 300 controls receiver 308, thereby activating, deactivating and supplying it with operating frequency. Furthermore, the system 300 performs timely estimations of the frequencies provided by clocks 302 and 304.

At first, the processor 318 activates the receiver 308. The receiver 308 receives an incoming reference signal from the antenna 312 and provides it to the estimator 310. This signal includes a base frequency which is considerably accurate. The reference signal also includes synchronization data.

The estimator 310 further receives signals from the clocks 302 and 304. Then, the estimator 310 provides frequency estimations to the processor 318 with respect to the frequencies generates by clocks 302 and 304.

The processor 318 calculates values M and N, according to the estimations provided thereto. After the receiver 308 finished receiving the reference signal, the processor 318 employs wait mode thereby deactivating the receiver 308 for a predetermined waiting time period T.

Then, the processor 318 operates the fast clock 302 and the slow clock 304, so as to measure this predetermined waiting time period T, according to any of the methods described hereinabove.

After the processor 318 indicated the end of time period T, it reactivates the receiver 308, which in turn receives a short hailing sequence in the above reference frequency. This hailing sequence often includes a synchronization sequence.

According to the present invention, the receiver 308 may provide an indication of the frequency of the reference signal or the signal itself, to the estimator 310, which in turn, utilizes it to re-estimate the frequencies of the clocks 302 and 304 and provides their estimations to the processor 318.

The receiver 308 further provides the synchronization sequence to the processor 318. Then, the processor 318 utilizes the information received from the receiver 308 and the estimator 310 to reassess M and N.

Finally, if the hailing signal did not include an indication of the identity of the receiver 308, then the receiver provides a command to the processor 318, so as to re-enter wait mode.

It will be appreciated that the method of the present invention is applicable to any communication system such as a cellular telephone, a pager, a wireless telephone. In addition, the present invention is also applicable to any device which may require a low power high resolution timer such as computers, calculators, alarm detectors and the like.

The following example demonstrates an implementation of the present invention for CDMA communication standards IS-95 and IS-98.

In CDMA, the short pseudonoise (PN) sequence (SPN) is a PN sequence, having a length of $2^{15}$, which is generated by a modified fifteen bit linear feedback shift register. This sequence is the main spreading component of the transmitted spread spectrum signal, with respect to the down-link direction.

The pilot signal is generally a predetermined PN sequence which is transmitted by all of the base stations. Since each base station uses a unique offset of the PN sequence, then each mobile can synchronize to a selected base station by detecting the predetermined PN sequence, at the unique offset of that base station. It will be noted that among the plurality of signals, which are transmitted by a base station, the pilot signal channel is the most powerful one.

The long code is basically a PN sequence having a length of $2^{42}-1$, which is used, in the down-link direction (i.e. from the base station to the mobile) for encryption and scrambling purposes. Each of these transmitted CDMA symbols is multiplied by a decimated long code bit, before transmission.

CDMA uses a group of orthogonal sequences, also known as Walsh sequences, to distinguish the signals which are transmitted to various mobile units. Accordingly, each mobile unit can detect a signal which is destined for it, by multiplying the received signal by the Walsh sequence, temporarily assigned thereto.

These CDMA standards enable dual mode operation of a mobile unit both as a telephone (mode-T) and as a pager (mode pager).

When operating in mode-T, in waiting mode, the time period between two subsequent hailing messages can be set to predetermined values, between 1.28 and 5.12 seconds. When operating in mode-pager, the time period between two subsequent hailing messages can reach a maximum of 163.8 seconds. The method according to the present invention addresses both modes, in a combined manner.

These CDMA standards impose strict frequency accuracy requirements, which most oscillators do not meet. Accordingly, the receiver has to compensate for any inaccuracy and error which are caused by the oscillators.

In conventional sleep modes, the voltage controlled temperature compensated crystal oscillator (VCTCXO) is running, thus enabling the receiver to keep track of time (keeping a continuous count of Long code, SPN and the like). It will be noted that in a receiver which includes a VCTCXO and a chip set, the power consumption of the chip set in waiting mode is $(I_{VCTCXO}+C\cdot V\cdot Z\cdot M)\cdot V$, where Z denotes the number of fast clock counts in a single slow clock count.

The method of the present invention shuts down the VCTCXO, during sleep mode and so, the time managing hardware unit runs according to a slow clock and is able to recover from the sleep mode and receive the paging channel. The recovery stage puts the system in a position in which it would be, had it not gone into sleep mode.

CDMA IS-95 traffic and paging channels operate according to 20 ms frames. The SPN sequence repeats every 26.6 ms. According to the present invention, the sleep mode mechanism operates according to time units (frames) of 26.6 ms. Inventors have found that operating the sleep mode mechanism according to the SPN sequence time period, yields enhanced efficiency, since it "freezes" the SPN. It will be noted that the present invention can be implemented using a sleep mechanism, which operates according to any time period.

The prior art methods disable selected units of the chip set for the entire sleep period and hence are able to recover only when this time period has elapsed. This poses a disadvantage when the user enters a waking-up command before the end of the sleep time period.

According to the present invention, the sleep mode mechanism performs a calculation of the current state at the end of each time unit (26.6 ms frame). Hence, the sleep mode mechanism is able to process a waking-up command received from the user at any stage of the sleep time period.

Figure 9:
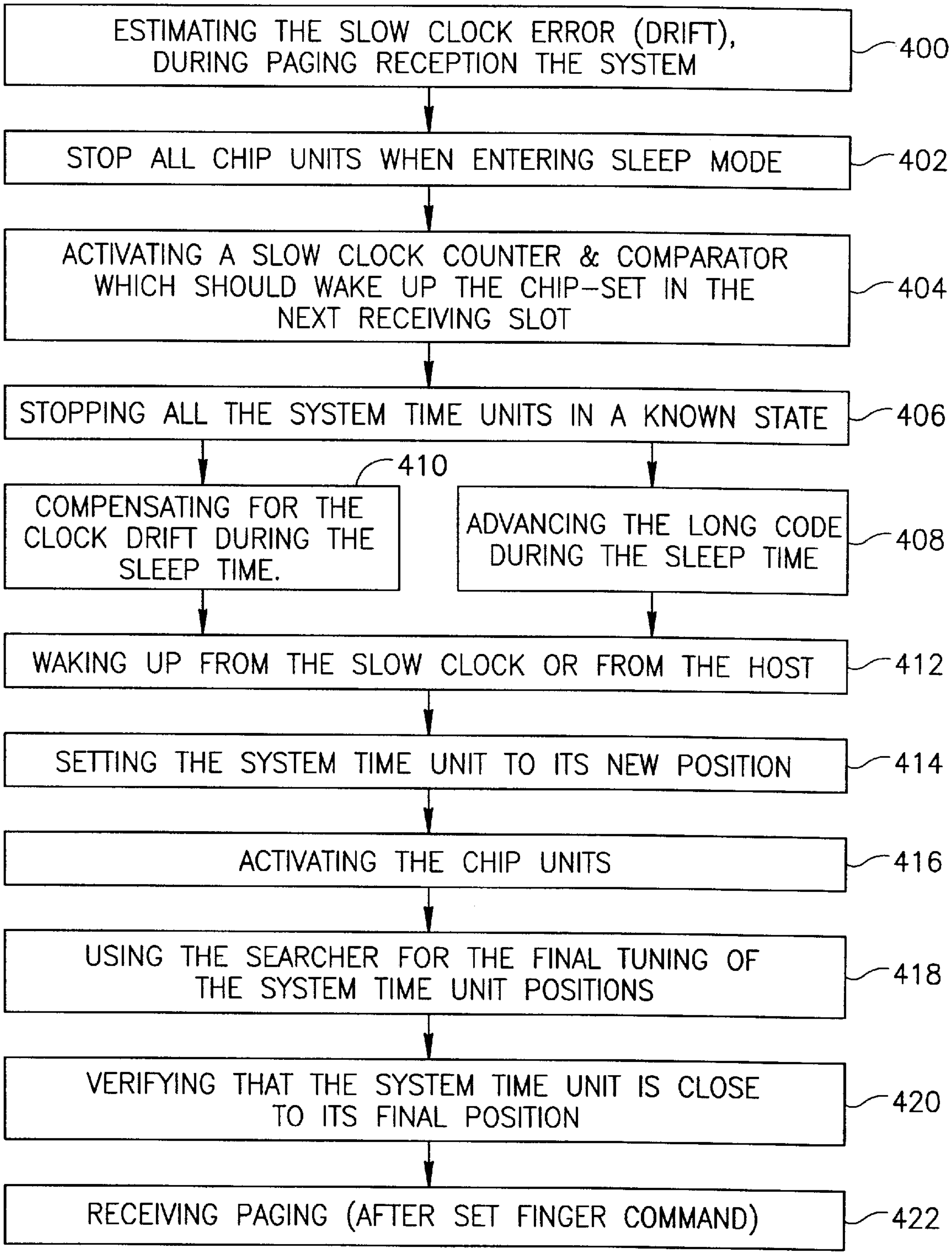
FIG. 9 is a schematic illustration of a method, operative in accordance with another preferred embodiment of the present invention.

Reference is now made to FIG. 9, which is a schematic illustration of a method, operative in accordance with another preferred embodiment of the present invention.

In step 400, the receiver estimates the frequency of the slow clock with reference to the frequency of the fast clock, during an operation of paging reception.

In step 402, the receiver disables the activity of most of the chip units in the chip-set, thereby entering sleep mode. The only hardware that remains active is responsible for counting the slow clock and compensating for drifts thereof.

In step 404, the receiver activates the slow clock counter and comparator which are responsible for waking up the disabled chip units of the chip-set at the next receiving slot.

In step 406, the receiver stops all of the time managing hardware units at a selected point in time, at which the receiver is at a certain state.

In step 408, the receiver advances the sleep mode timing mechanism. The slow clock counts estimated 26.6 ms frames. After each such estimated frame, the sleep mode mechanism advances the system 26.6 frame counter by one and at the same time, re-adjusts the long code state by 32768 steps (i.e. which are the number of long code steps in a 26.6 ms frame)

In step 410, the sleep mode mechanism compensates for any drift of the slow clock during sleep mode time. The drift is calculated as follows:

$$T=N\times T_L+M\times T_H$$

Each time unit (26.6 ms) is represented by X×(slow clock counts)+Y×(fast clock counts). Z denotes the number fast clock counts in a single slow clock count. W accumulates the number of additional fast clock counts during the sleep period. For every count of X slow clock counts, the sleep time mechanism performs the following operations:

the sleep time mechanism accumulates an additional Y counts into W.

When W is equal or greater then Z, the following count of time units (26.6 ms) will be performed according to X+1 slow clock counts instead of X slow clock counts and the sleep mode mechanism decreases W by Z counts.

In step 412, the sleep mode mechanism operates according to a waking up command. This command can either be generated internally by the sleep mode mechanism at the end of a predetermined time unit (26.6 frame), which indicates that the sleep mode time-period has elapsed, or it can be provided from the host.

At this stage the sleep mode mechanism enables the VCTCXO, and after the VCTCXO is stable, the sleep mode mechanism enables some of the disabled units of the chip-set. It is noted that the sleep mode mechanism awakes the VCTCXO a few cycles sooner, so that it will have enough time to stabilize.

In step 414, the sleep mode mechanism sets the time managing hardware unit to a new position, as will be explained in further detail hereinbelow. It will be noted that at this step, the sleep mode mechanism reverts from slow clock time resolution to fast clock time resolution and compensates according to the remaining W accumulated fast counts.

In step 416, the sleep mode mechanism enables [reactivates] the remaining disabled chip units.

In step 418, the receiver uses a searching module for final tuning the position of the time managing HW units and is thus ready to receive the paging channel.

Figure 10:
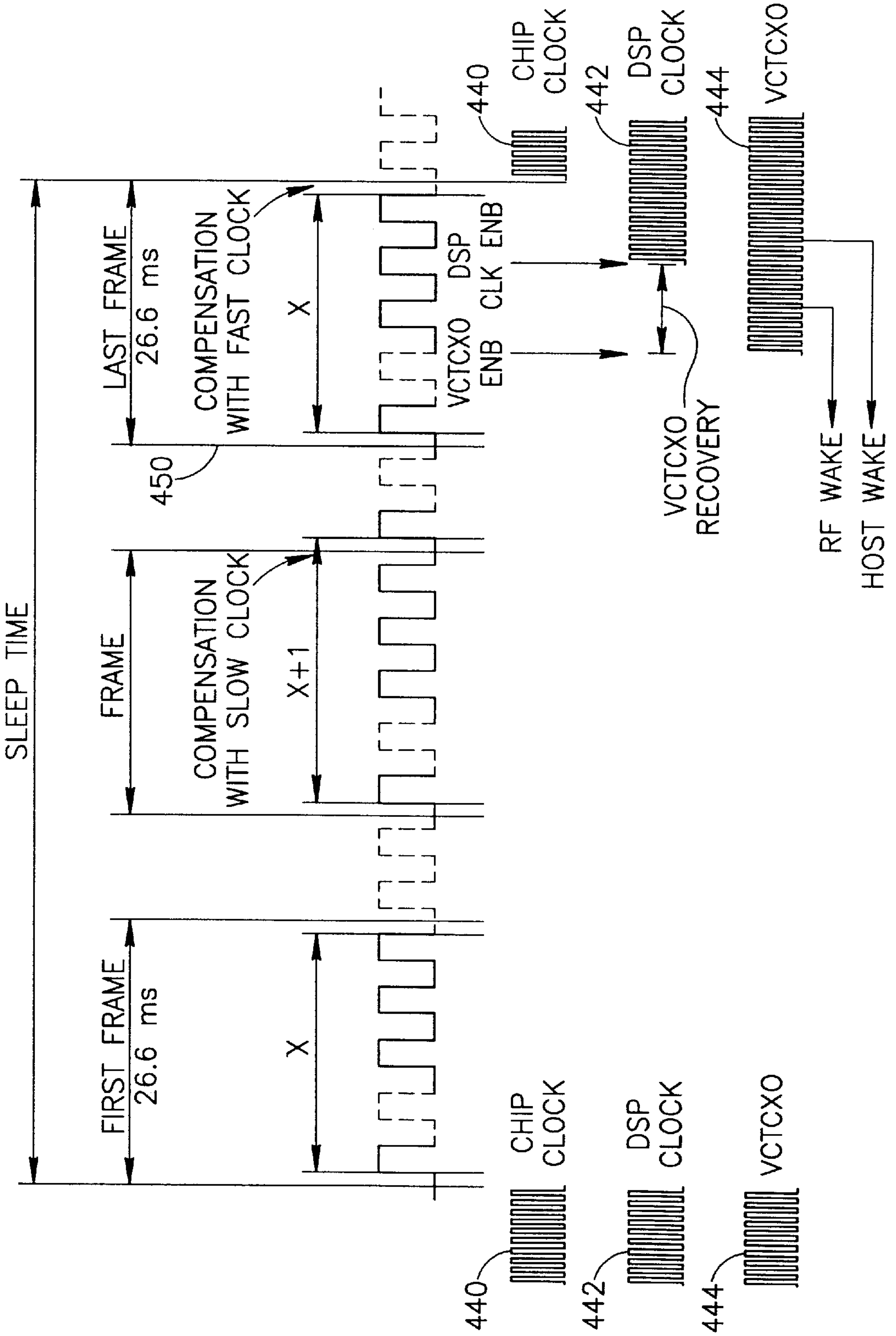
FIG. 10 is a schematic illustration of a timing scheme, according to the present invention.

Reference is now made to FIG. 10, which is a schematic illustration of a timing scheme, according to the present invention.

FIG. 10 presents the timing signals of the chip-set fast clock 440, the DSP clock 442 and the VCTCXO 444, which are all shut down at the same time, in the beginning of the sleep mode time period.

In the last frame 450, the VCTCXO is enabled before the DSP clock and the chip clock a predefined time before it is needed for running the DSP. It will be noted that this is done because the VCTCXO requires time to stabilize.

The VCTCXO is then used by the HW to compensate for the remaining fast clock cycles, before reactivating the time managing HW unit in the regular operation mode.

It will be noted that the slow clock accuracy is very low, with comparison to the 813 ns (which is the value of $T_C$) requirement of the communication standards. The accuracy of the slow clock is thus measured and estimated whenever the fast clock is active and accurate (CDMA receiving).

As explained herein above, operating the slow clock in sleep mode requires some parameters, which are measured, calculated, estimated and stored before entering sleep mode. The measurement and estimation of these parameters can be performed in many ways.

These parameters include the number of slow clock counts in a time unit (26.6 ms frame), the number of additional fast clock counts in a time unit (26.6 ms frame), the number of fast clock counts in a single slow clock count, and the like.

It will be appreciated by persons skilled in the art that the present invention is not limited to what has been particularly shown and described hereinabove. Rather the scope of the present invention is defined only by the claims which follow.

What is claimed is:

1. A method comprising:

entering sleep mode in a receiver;

deactivating a frequency generator of said receiver, said frequency generator generating a first signal having a first frequency;

counting predetermined portions of a second signal whose frequency is less than said first frequency; and at the end of each of said predetermined portions of said second signal:

determining whether to exit said sleep mode; and updating a long pseudonoise sequence of said receiver.

2. The method of claim 1, wherein said predetermined portions correspond to the periodicity of a short pseudonoise sequence.

3. The method of claim 1, wherein counting said predetermined portions includes compensating for drifts of said second signal.

* * * * *